(12) United States Patent
Campbell

(10) Patent No.: US 11,245,427 B1
(45) Date of Patent: Feb. 8, 2022

(54) FREQUENCY SELECTIVE LIMITER

(71) Applicant: Qorvo US, Inc., Greensboro, NC (US)

(72) Inventor: Charles Forrest Campbell, Dallas, TX (US)

(73) Assignee: QORVO US, INC., Greensboro, NC (US)

(*) Notice: Subject to any disclaimer, the term of this patent is extended or adjusted under 35 U.S.C. 154(b) by 0 days.

(21) Appl. No.: 17/173,920

(22) Filed: Feb. 11, 2021

(51) Int. Cl.
*H04B 1/00* (2006.01)
*H04B 1/7093* (2011.01)

(52) U.S. Cl.
CPC .......... *H04B 1/0078* (2013.01); *H04B 1/006* (2013.01); *H04B 1/7093* (2013.01); *H04B 2001/70935* (2013.01)

(58) Field of Classification Search
CPC .... H04B 1/0057; H04B 1/006; H04B 1/0067; H04B 1/0078; H04B 1/10; H04B 1/1018; H04B 1/18; H04B 1/7093; H04B 2001/70935
USPC ........ 375/224, 340, 346, 350; 370/278, 299; 455/63.3, 67.13, 68, 70, 71, 226.1, 339
See application file for complete search history.

(56) References Cited

U.S. PATENT DOCUMENTS

| | | | | |
|---|---|---|---|---|
| 2005/0164665 A1* | 7/2005 | Suganuma | ............. | H04B 1/109 455/278.1 |
| 2006/0291511 A1* | 12/2006 | Lan | ...................... | H01S 3/1312 372/38.01 |
| 2012/0027141 A1* | 2/2012 | Petrovic | ................... | H04B 1/10 375/350 |
| 2015/0105038 A1* | 4/2015 | Lascari | .................... | H04B 1/28 455/230 |
| 2016/0211882 A1* | 7/2016 | Hwang | .................. | H04B 1/126 |
| 2017/0160312 A1* | 6/2017 | Li | .......................... | G01R 15/04 |

OTHER PUBLICATIONS

Giarola, A. J. "A Review of the Theory, Characteristics, and Operation of Frequency Selective Limiters," Proceedings of the IEEE, vol. 67, No. 10, Oct. 1979, pp. 1380-1396.

(Continued)

*Primary Examiner* — Young T. Tse
(74) *Attorney, Agent, or Firm* — Withrow & Terranova, P.L.L.C.

(57) ABSTRACT

Disclosed is a frequency selective limiter with a switched multiplexer filter bank having a plurality of filters coupled between antenna and receiver ports, wherein the switched multiplexer filter bank is configured to enable and disable selected ones of the plurality of filters in response to control signals. First detector circuitry is coupled to the antenna port and configured to detect signal voltage at the antenna port and generate a first detector voltage. Second detector circuitry is coupled to the receiver port and configured to detect signal voltage at the receiver port and generate a second detector voltage, and a digital controller is coupled between the first detector circuitry, the second detector circuitry, and a control interface, wherein the digital controller is configured to limit interfering signals by sending control signals to the switched multiplexer filter bank in response to the first detector voltage and the second detector voltage.

18 Claims, 12 Drawing Sheets

(56) References Cited

OTHER PUBLICATIONS

Guyette, A. C. "Theory and Design of Intrinsically Switched Multiplexers with Optimum Phase Linearity," IEEE Transactions in Microwave Theory and Techniques, vol. 61, No. 9, Sep. 2013, pp. 3254-3264.

Naglich, E. J., and A. C. Guyette. "Frequency Selective Limiters Utilizing Contiguous-Channel Double Multiplexer Topology," IEEE Transactions in Microwave Theory and Techniques, vol. 64, No. 9, Sep. 2016, pp. 2871-2882.

* cited by examiner

| STATE ORDER | FSL SETTING |
|---|---|
| 1 | 1111111 |
| 2 | 0011111 |
| 3 | 1001111 |
| 4 | 1100111 |
| 5 | 1110011 |
| 6 | 1111001 |
| 7 | 1111100 |
| 8 | 0001111 |
| 9 | 1000111 |
| 10 | 1100011 |
| 11 | 1110001 |
| 12 | 1111000 |

PROCESS 2-CHANNEL STATES FOR MAXIMUM BANDPASS REGION. (States 1–7)

IF TARGET REJECTION IS NOT MET, RESORT TO 3-CHANNEL STATES. (States 8–12)

*FIG. 7A*

FREQUENCY SELECTIVE LIMITER

FIELD OF THE DISCLOSURE

The present disclosure relates to radio frequency filters and in particular to dynamic radio frequency filters that are employed to limit power of jamming signals.

BACKGROUND

Typical switched multiplexer frequency selective limiters (FSLs) utilize embedded analog detectors within filters to determine which one of the filters to engage in a continuous analog manner. As the selected filter is engaged, the radio frequency power level at the detection point starts to decrease and additional radio frequency power is required to continue the limiting process. This feedback makes it difficult to utilize this type of FSL for limiting jamming signals. Thus, there remains a need for an FSL that simplifies operation while improving effectiveness of limiting jamming signals.

SUMMARY

Disclosed is a frequency selective limiter with a switched multiplexer filter bank having a plurality of filters coupled between antenna and receiver ports, wherein the switched multiplexer filter bank is configured to enable and disable selected ones of the plurality of filters in response to control signals. First detector circuitry is coupled to the antenna port and configured to detect signal voltage at the antenna port and generate a first detector voltage. Second detector circuitry is coupled to the receiver port and configured to detect signal voltage at the receiver port and generate a second detector voltage, and a digital controller is coupled between the first detector circuitry, the second detector circuitry, and a control interface, wherein the digital controller is configured to limit interfering signals by sending control signals to the switched multiplexer filter bank in response to the first detector voltage and the second detector voltage. Further disclosed is a control process executed by the digital controller to select which of the plurality of filters to enable and disable to maximize limiting of interfering signals at either of the antenna port or the receiver port.

Those skilled in the art will appreciate the scope of the present disclosure and realize additional aspects thereof after reading the following detailed description in association with the accompanying drawings.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 7A is a table listing state order and FSL settings for processing 2-channel states and 3-channel states associated with the FSL of FIG. 4A.

DETAILED DESCRIPTION

Figure 1A:
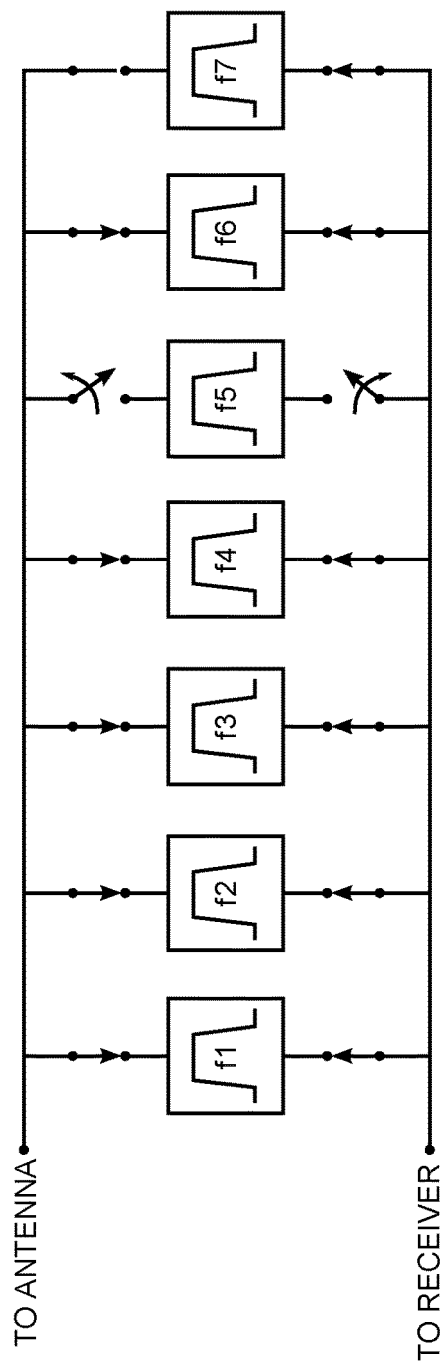
FIG. 1A is a diagram depicted a related-art intrinsically switched multiplexer.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments are described herein with reference to schematic illustrations of embodiments of the disclosure. As such, the actual dimensions of the layers and elements can be different, and variations from the shapes of the illustrations as a result, for example, of manufacturing techniques and/or tolerances, are expected. For example, a region illustrated or described as square or rectangular can have rounded or curved features, and regions shown as straight lines may have some irregularity. Thus, the regions illustrated in the figures are schematic and their shapes are not intended to illustrate the precise shape of a region of a device and are not intended to limit the scope of the disclosure. Additionally, sizes of structures or regions may be exaggerated relative to other structures or regions for illustrative purposes and, thus, are provided to illustrate the general structures of the present subject matter and may or may not be drawn to scale. Common elements between figures may be shown herein with common element numbers and may not be subsequently re-described.

Limiters are widely used and are necessary components to protect the receiver in a communications front-end from intentional or unintentional radio frequency (RF) signals large enough to impair receiver operation. When typical limiters are activated, the receiver is protected; however, the receiver is rendered useless as a receiver as long as the limiter is engaged. The limiter blocks signals over its entire operating band even though the potentially interfering signal may occupy a very small amount of the bandwidth or be at a single frequency. A frequency selective limiter (FSL), on the other hand, only blocks signals larger than some threshold power and allows smaller signals at different frequencies to pass. The receiver is therefore not rendered completely nonfunctional during the limiting process. Most FSLs are magnetic devices where large RF signals interact with magnetic spin waves and energy is absorbed or reflected at specific frequencies. Magnetic FSLs are generally not monolithically compatible with semiconductor technology and may require an external magnet. Another type of FSL is based on banks of filters that can be individually activated or deactivated to pass or block signals within the filter bands. Of particular interest is the intrinsically switched multiplexer architecture. The related-art FSL design uses PIN diodes as the switching elements. At low input power the diodes are in the OFF state and the filter is not limiting. As the FSL input power increases, the PIN diodes start to turn on, transitioning the state of the filter channel. As the filter turns off, the RF power incident on the PIN diodes also decreases and additional power is required to continue to transition the FSL channel. The net effect of this feedback mechanism is that a large amount of incident power is required to get substantial amounts of rejection. For the related-art design, more than 1 W of incident power was required to realize 15 dB of rejection. The signal level required to jam modern receivers is much lower, typically in the −10 dBm to −20 dBm range. This related-art design can still work as an FSL, but an alternate approach to disabling a filter channel is required.

The present disclosure describes a sense and control method for an intrinsically switched filter multiplexer frequency selective limiter (FSL). This type of FSL can be described as a switched notch filter bank with an all-pass nonlimiting state over the operational band. Potentially damaging or jamming signals are blocked from the receiver input by identifying each frequency of the potentially damaging or damaging signals and enabling corresponding filters. The present disclosure describes a FSL and digital control method with the following features:

Operation with two detectors, one at the FSL input and one at the FSL output, with no embedded sensors. Typically, there would be an N number of embedded sensors for an N number of filter channels.
  Capability of limiting low power signals with an adjustable threshold of limiting.
  No requirement for any additional filtering, analog-to-digital converters, or frequency synthesis for optimal filter selection.
  Utilization of digital control of the filter bank to avoid issues associated with analog feedback.
  FSL, detection circuitry, and operation amplifier compatibility with monolithic implementation.

Figure 1B:
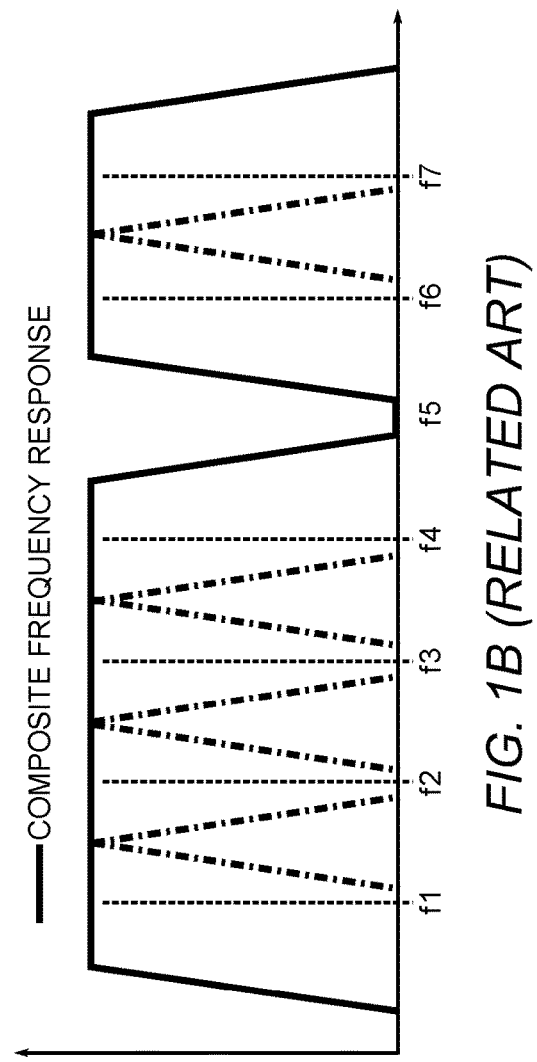
FIG. 1B is a graph showing a theoretical composite response for the related-art intrinsically switched multiplexer of FIG. 1A.

The basic architecture of the related-art FSL is shown in FIG. 1A, which shows a parallel connection of N intrinsically switched bandpass filters designed to produce a composite frequency response that covers a desired bandwidth. When an interferer is detected, the appropriate filter is switched out of the multiplexer, preventing the unwanted signal from reaching the receiver. This scenario is illustrated in FIG. 1A for channel 5 of a seven-channel FSL. FIG. 1B is a graph showing a theoretical composite frequency response for the related-art intrinsically switched multiplexer of FIG. 1A.

Figure 2A:
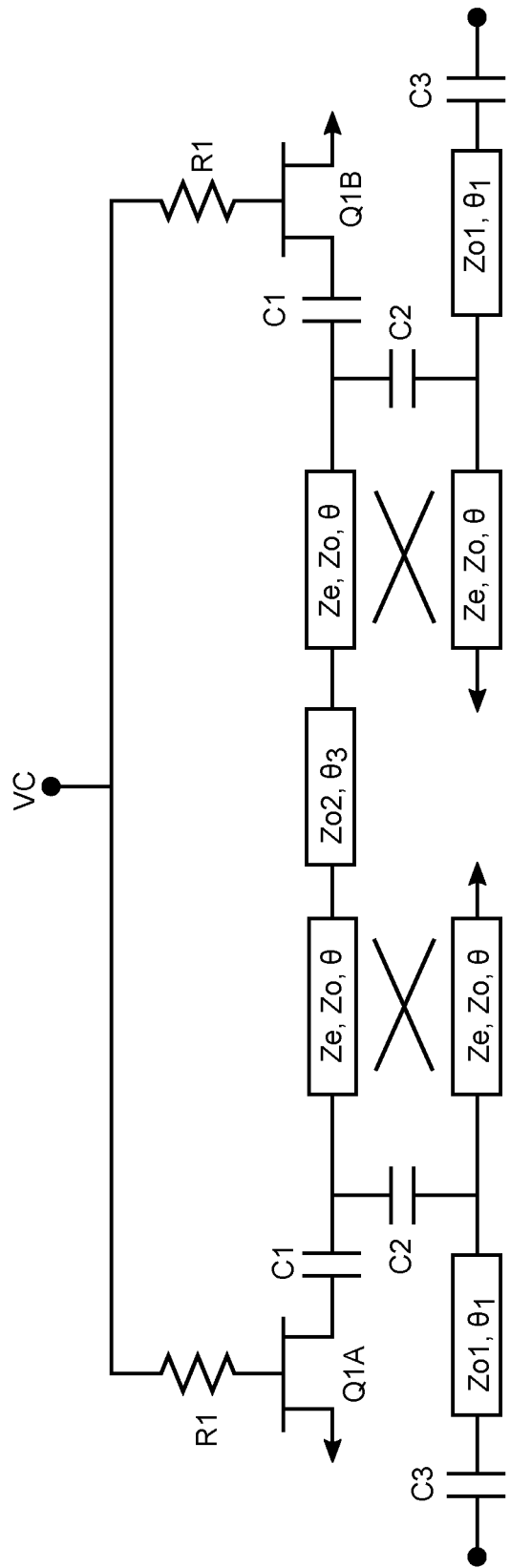
FIG. 2A is a diagram of a related-art intrinsically switched gallium arsenide (GaAs) filter circuit that may be realized in a printed circuit board with discrete components.

Another related art intrinsically switched filter exhibits a number of properties that allow the structure shown in FIG. 1A to work. A schematic for the related-art intrinsically switched filter is shown in FIG. 2A utilizing field-effect transistors (FETs) Q1A and Q1B as the switching elements. The related-art intrinsically switched filter may be realized in a printed circuit board with discrete components. When the switching elements are open, the related-art intrinsically switched filter functions as a three-pole bandpass filter. In contrast, when the switching elements are closed, an all-stop function is realized. Another feature of this related-art intrinsically switched filter is that the out-of-band impedances are similar for the bandpass and all-stop states. This means that when one of the filters is switched to the all-stop state to block an interferer, the all-stop state does not substantially alter the loading of the other filter channels.

Figure 2B:
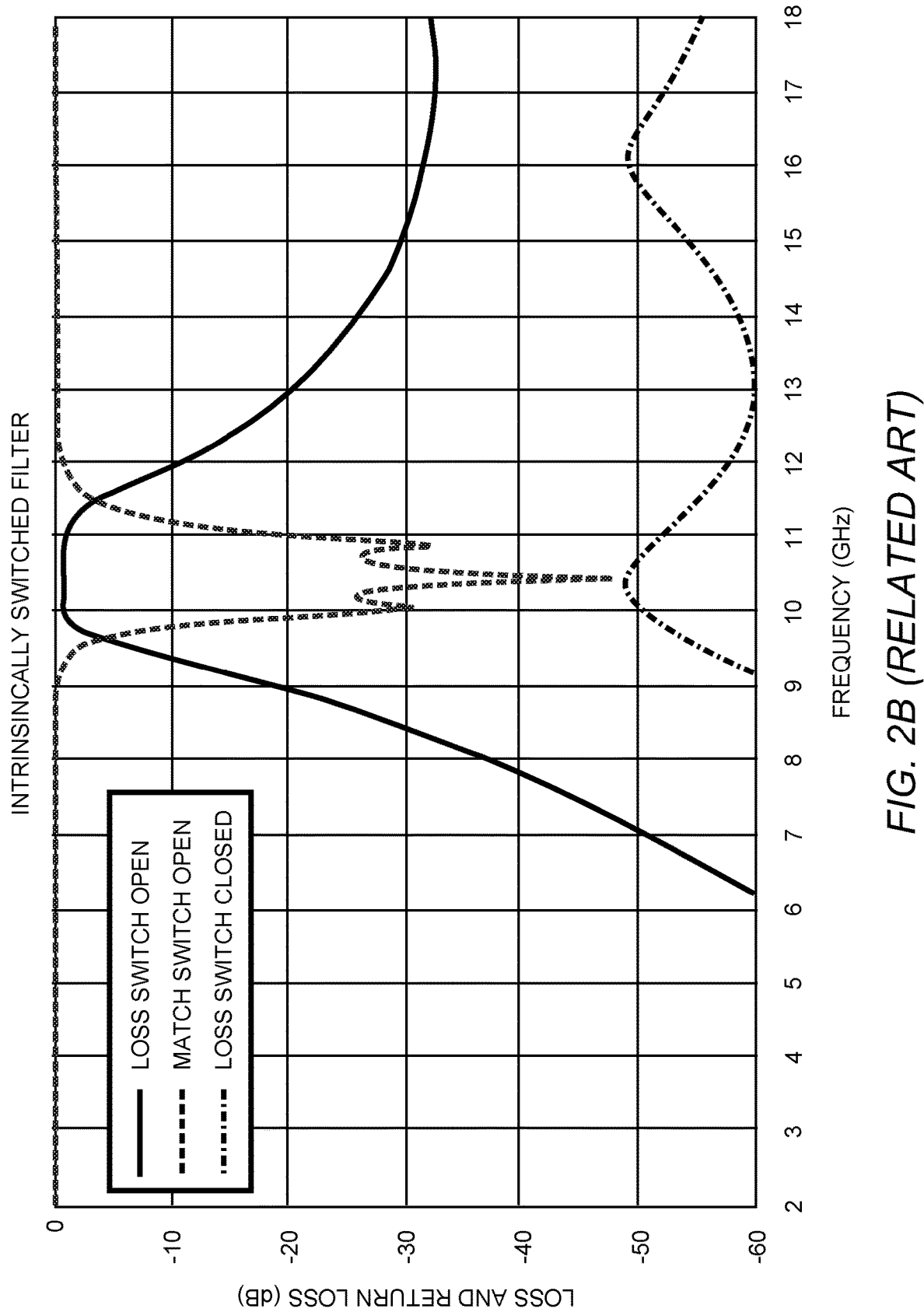
FIG. 2B is a graph of a simulated response for the related-art intrinsically switched GaAs filter circuit of FIG. 2A.

As depicted in FIG. 2B, a simulation of a 9 GHz to 10 GHz filter on 100 µm thick gallium arsenide (GaAs) using 90 nm pseudomorphic high electron mobility transistor (PHEMT) switch FETs suggests an insertion loss of less than 1 dB for the bandpass state. In some embodiments, the all-stop state provides greater than 35 dB of rejection over the entire 2 GHz to 18 GHz frequency band. In other embodiments, the all-stop state provides about 50 dB of rejection over the entire 2 GHz to 18 GHz frequency band.

Figure 3A:
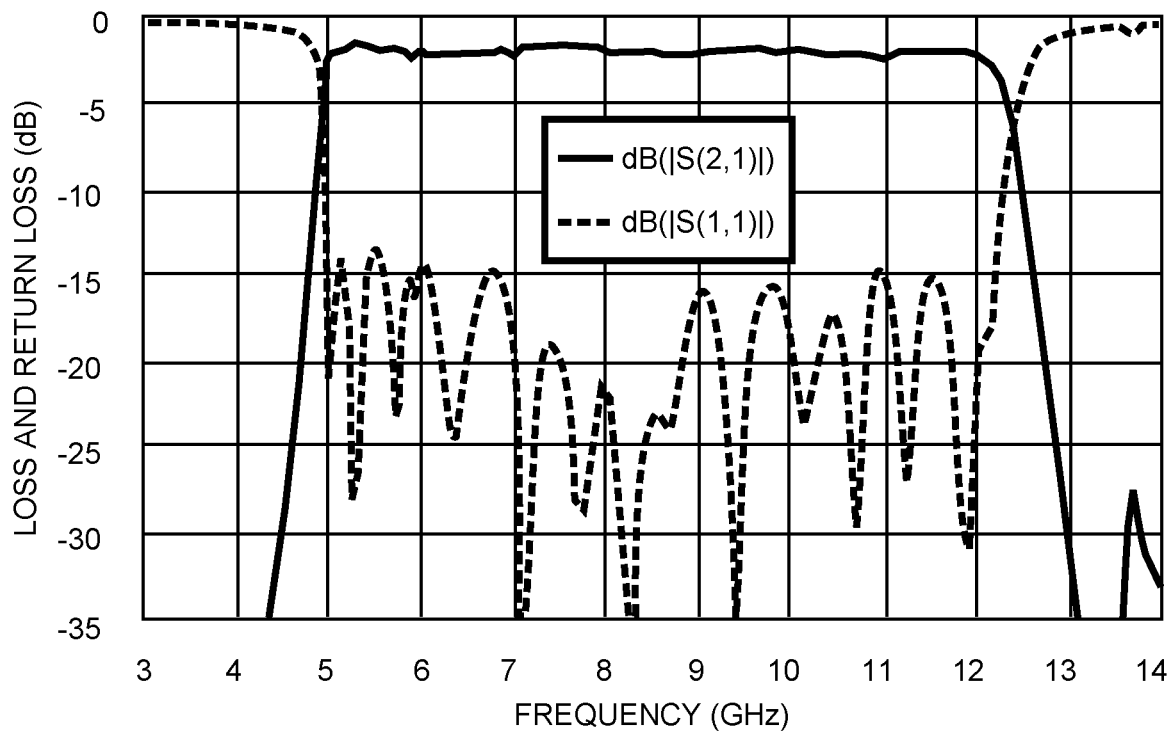
FIG. 3A is a graph showing simulation for a related-art seven-channel intrinsically switch multiplexer frequency selective limiter (FSL) set to state 1111111.
Figure 3B:
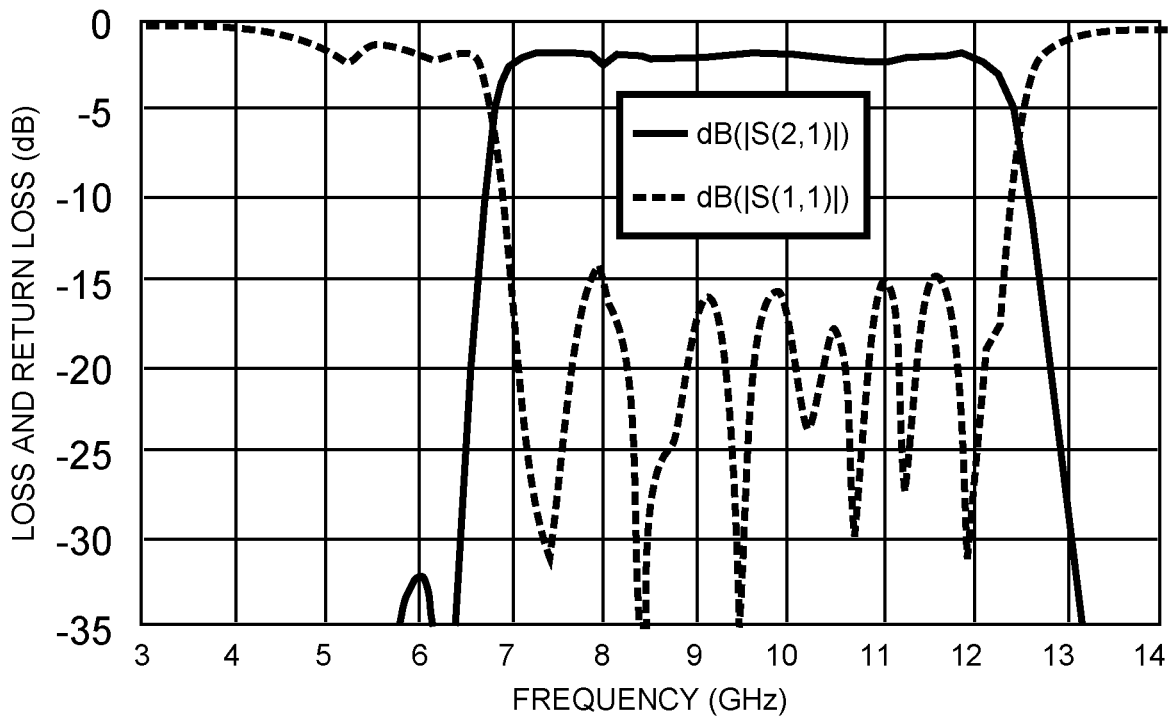
FIG. 3B is a graph showing simulation for a related-art seven-channel intrinsically switch multiplexer FSL set to state 0011111.
Figure 3C:
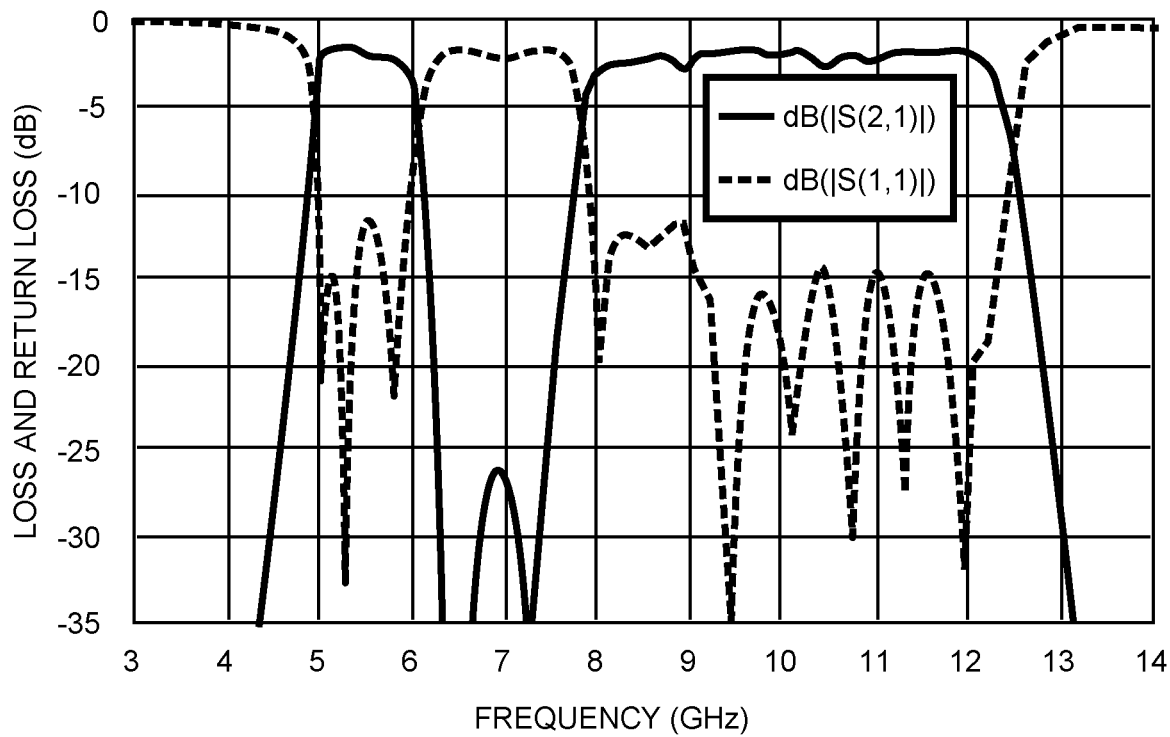
FIG. 3C is a graph showing simulation for a related-art seven-channel intrinsically switch multiplexer FSL set to state 1001111.
Figure 3D:
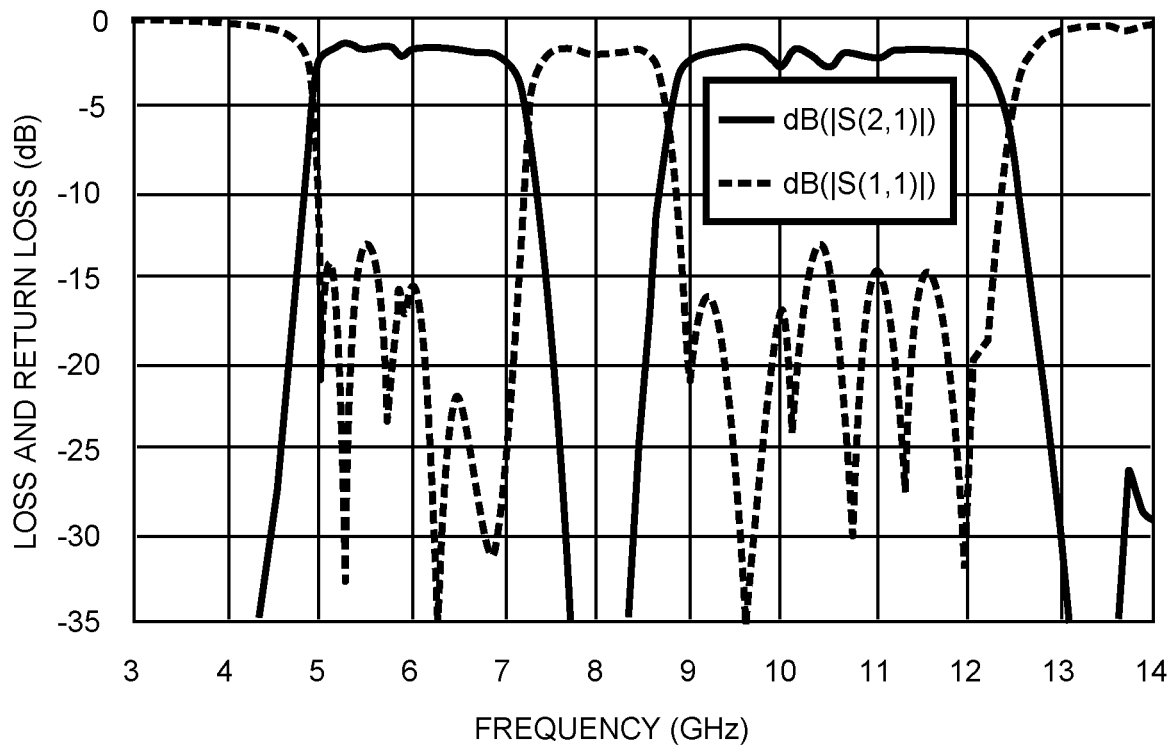
FIG. 3D is a graph showing simulation for a related-art seven-channel intrinsically switch multiplexer FSL set to state 1100111.
Figure 3E:
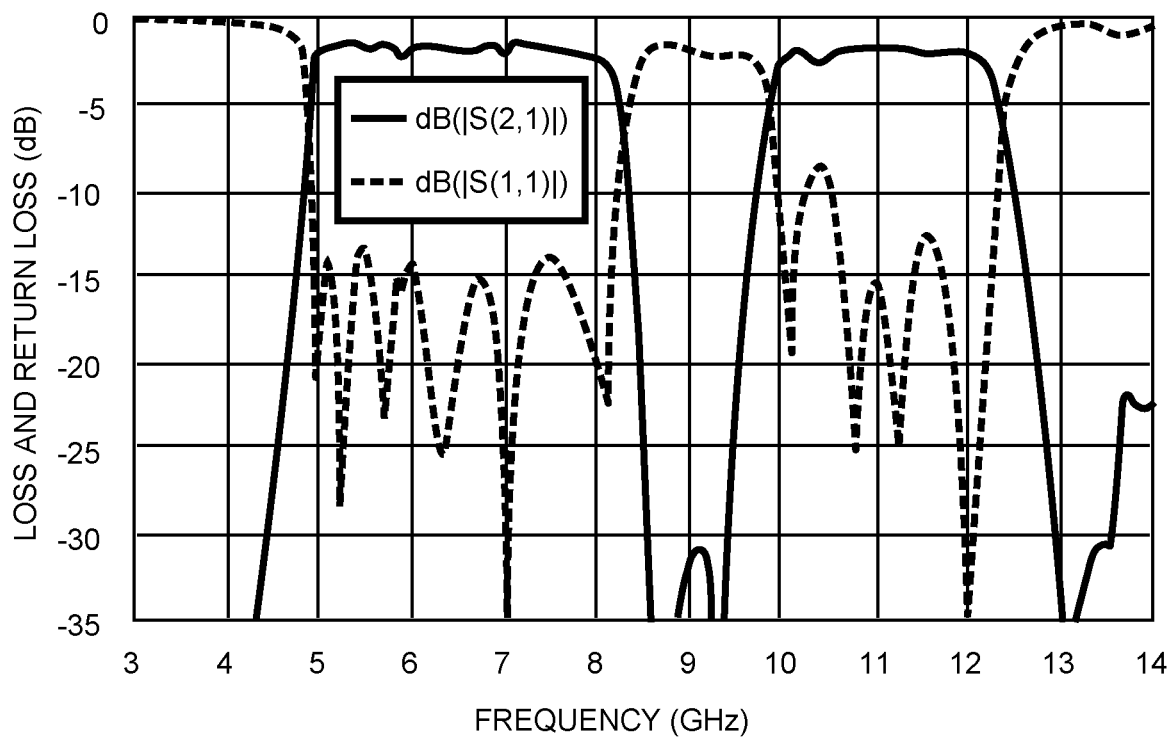
FIG. 3E is a graph showing simulation for a related-art seven-channel intrinsically switch multiplexer FSL set to state 1111001.
Figure 3F:
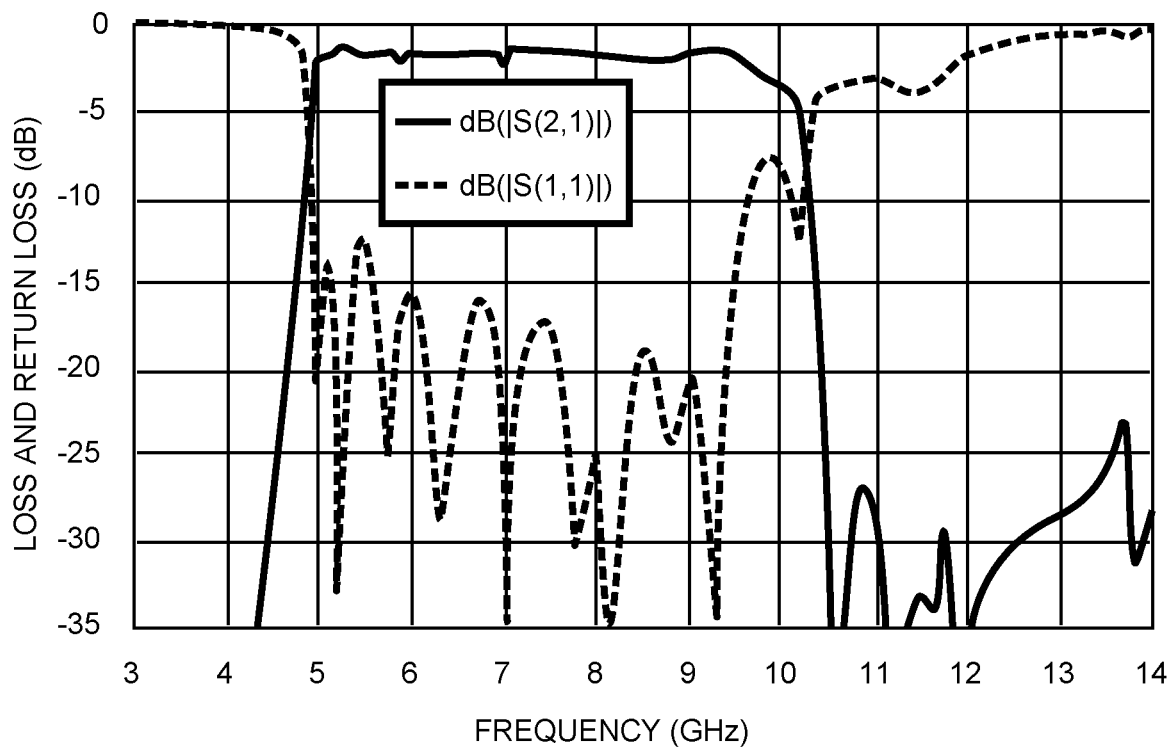
FIG. 3F is a graph showing simulation for a related-art seven-channel intrinsically switch multiplexer FSL set to state 1111100.

A seven-channel version of the related-art intrinsically switched filter synthesized in monolithic microwave integrated circuit (MMIC) in 90 nm GaAs PHEMT process technology validates the simulation depicted in FIG. 2B. Each of seven filters for the seven-channel version has 1 GHz of bandwidth and a composite response that covers 5 GHz to 12 GHz. Simulations for a few of the states are shown in FIGS. 3A, 3B, 3C, 3D, 3E, and 3F. A non-limiting low loss state has an FSL setting of 1111111 as depicted in FIG. 3A. FIG. 3B is a graph showing simulation for a seven-channel intrinsically switched multiplexer FSL set to state 0011111. FIG. 3C is a graph showing simulation for a seven-channel intrinsically switch multiplexer FSL set to state 1001111. FIG. 3D is a graph showing simulation for a seven-channel intrinsically switched multiplexer FSL set to state 1100111. FIG. 3E is a graph showing simulation for a seven-channel intrinsically switched multiplexer FSL set to state 1111001. FIG. 3F is a graph showing simulation for a seven-channel intrinsically switched multiplexer FSL set to state 1111100.

By disabling pairs of adjacent filter channels, substantial levels of rejection can be achieved anywhere in the 5 GHz to 12 GHz operating band. In this test setup a seven-channel switched filter bank is manually controlled by applying bias to the gates of the switch FETs.

Figure 4A:
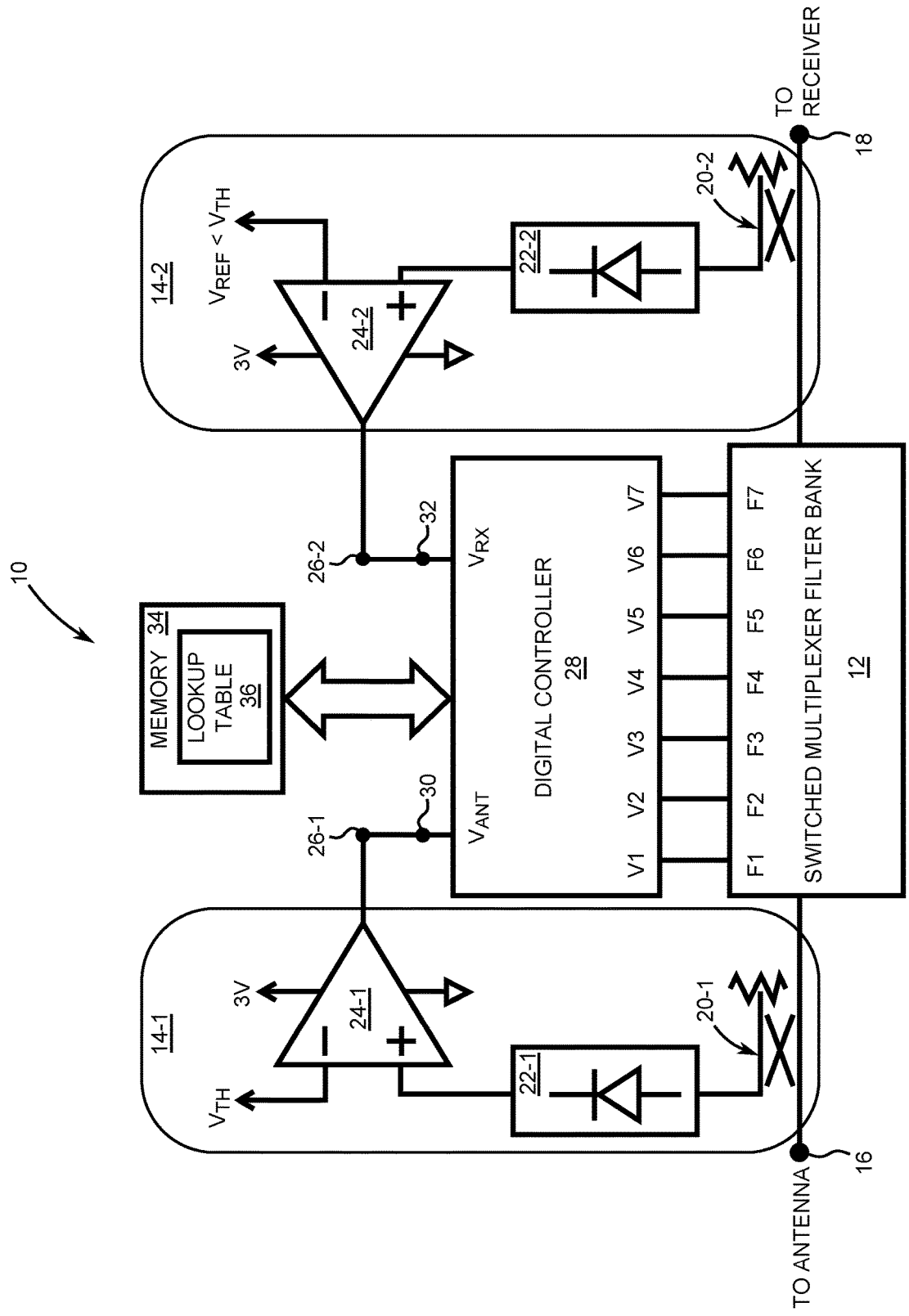
FIG. 4A is a diagram depicting an FSL structured in accordance with the present disclosure.

FIG. 4A is a diagram depicting an exemplary embodiment of an FSL 10 that is structured in accordance with the present disclosure. To realize the FSL 10, sense and control must be added. Regarding sense, an incoming signal is considered as interference if the signal is larger than some predetermined threshold power level. Regarding control, filter channels are biased to reject only the interfering signal while simultaneously allowing desired signals at different frequencies to pass. If the interfering signal changes frequency, is turned off, or moves out of band, the control of the FSL 10 responds by returning to the non-limiting low loss state, that is, the 1111111 state. However, if the interferer changed frequency but remained in band, the FSL 10 would move the FSL state to the next state.

The FSL 10 includes a switched multiplexer filter bank 12 that is intrinsically switched and may be operated as a low-resolution spectrum analyzer. The disclosed control process takes advantage of low-resolution spectrum analyzer operation and does not require any additional filtering, frequency detection, or synthesis. The FSL 10 has first detection circuitry 14-1 coupled to an antenna (ANT) port 16 and second detection circuitry 14-2 coupled to a receive (RX) port 18. It is to be understood that different embodiments of the first detection circuitry 14-1 and the second detection circuitry 14-2 other than that shown in FIG. 4A may be employed without deviating from the present disclosure. An exemplary embodiment of the first detection circuitry 14-1 depicted in FIG. 4A includes a first RF coupler 20-1, a first logarithmic detector 22-1, and a first operational amplifier 24-1, and the second detection circuitry 14-2 includes a second RF coupler 20-2, a second logarithmic detector 22-2, and a second operational amplifier 24-2. The first operational amplifier 24-1 has a first output terminal 26-1, and the second operational amplifier 24-2 has a second output 26-2. Note that the first operational amplifier 24-1 and the second operational amplifier 24-2 are shown with no feedback for illustration only, as small amounts of positive feedback may be added to improve performance. Both the first RF coupler 20-1 and the second RF coupler 20-2 are directional couplers that each have a relatively low coupling coefficient. Directionality minimizes the detected voltage variation over frequency as filters of the switched multiplexer filter bank 12 are switched in and out. A low coupling coefficient minimizes the impact to insertion loss from coupling off energy.

The FSL 10 further includes a digital controller 28 configured to control the switched multiplexer filter bank 12. The digital controller 28 has an antenna voltage $V_{ANT}$ input terminal 30 coupled to the first output terminal 26-1 of the first operational amplifier 24-1. The digital controller 28 also has a receiver voltage $V_{RX}$ input terminal 32 coupled to the second output terminal 26-2 of the second operational amplifier 24-2. The digital controller 28 also includes control voltage outputs V1, V2, V3, V4, V5, V6, and V7 that are coupled to filter switch inputs F1, F2, F3, F4, F5, F6, and F7, respectively, of that switched multiplexer filter bank 12. A memory 34 may be interfaced with digital controller to store data such as a lookup table 36. The lookup table 36 may store values of FSL states that are used by the digital controller 28 to enable and disable filters in the switched multiplexer filter bank 12.

Figure 4B:
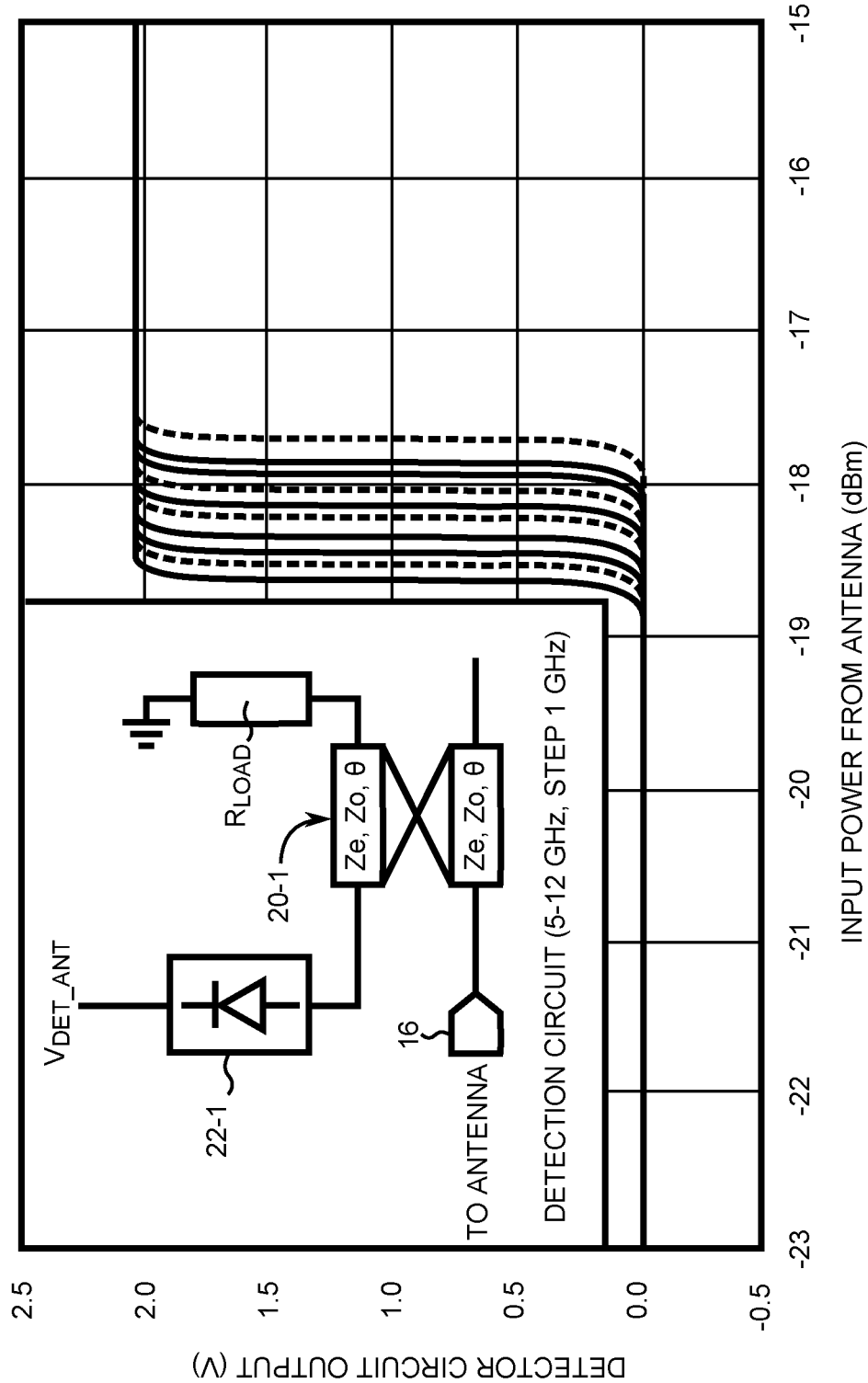
FIG. 4B is a graph of output voltage for a detector circuit (inset) versus input power from an antenna detector circuit of the FSL of FIG. 4A.

FIG. 4B is a graph of output voltage versus input power for a detection circuit (inset) of the first detection circuitry 14-1 of the FSL 10 of FIG. 4A. In this example, the detector circuit comprised of the first RF coupler 20-1, the first logarithmic detector 22-1, and a load resistor $R_{LOAD}$ was simulated operating between 5 GHz and 12 GHz with a step size of 1 GHz. There are two FSL states shown on this plot that demonstrate high directivity over frequency. The solid lines are the 1111111 state, which is a relatively good 50Ω match over the operating frequency range. Coupler directivity does not matter here, as very little power reflects back from the FSL input for the 1111111 state. The dashed lines are for the 0000000 state, which is highly reflective over the operating frequency band. If the coupler directivity was not high, then the dashed curves would not be transitioning in the same range as the solid traces. Note that the solid traces represent the 1111111 state and the dashed traces represent the 0000000.

Figure 5A:
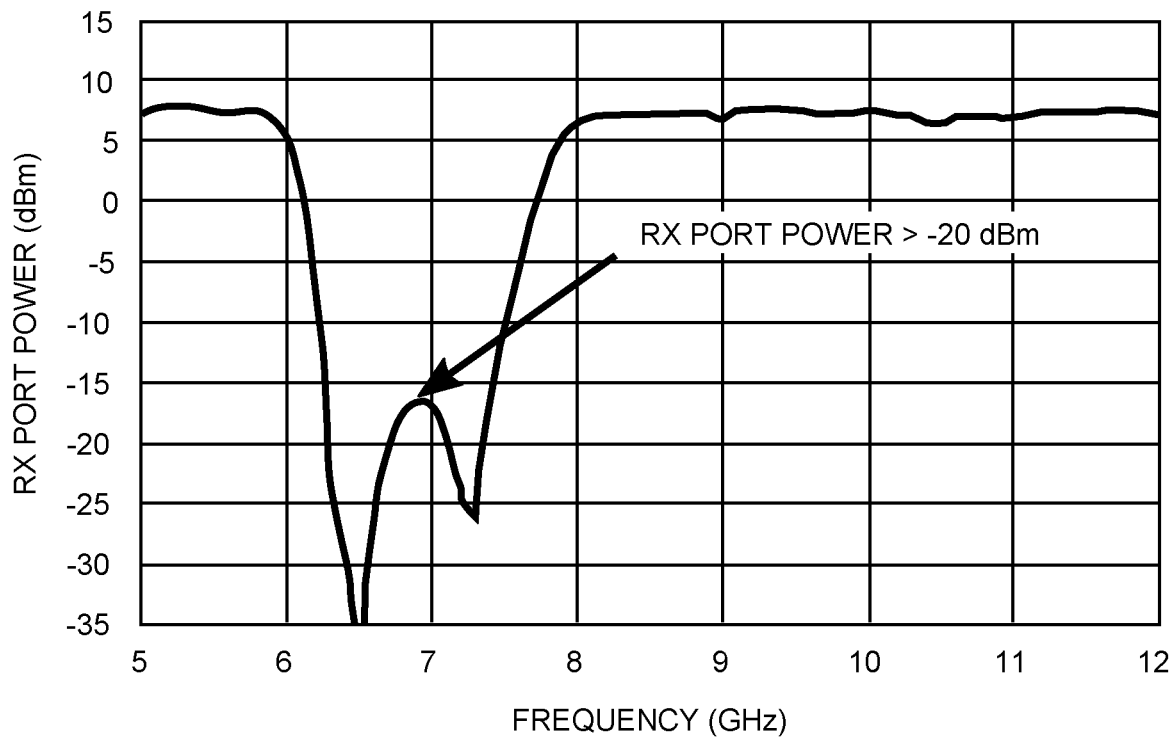
FIG. 5A is a graph showing simulation of receiver port power for the FSL of FIG. 4A with the seven-channel intrinsically switch multiplexer FSL set to state 1001111 with the receiver port input having a 10 dBm interferer.
Figure 5B:
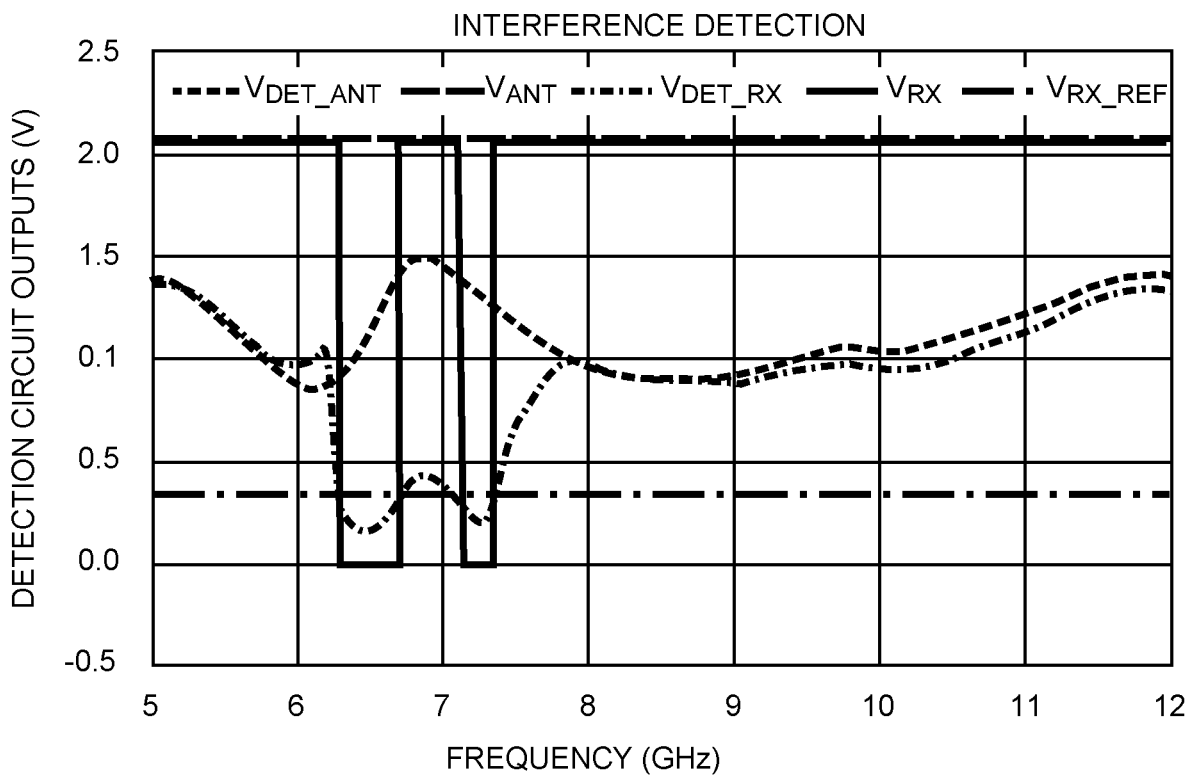
FIG. 5B is a graph of signals associated with interferer detection for the FSL of FIG. 4A with the antenna port input having a 10 dBm interferer.

The exemplary embodiment of the FSL 10 depicted in FIG. 4A operates as follows. The first detection circuitry 14-1 senses the presence of an interfering signal, which is assumed in this case to be anything over 10 dBm. The threshold power level can be adjusted via an inverting pin voltage threshold VTH of the first operational amplifier 14-1. In the absence of an interfering signal, the FSL 10 defaults to the non-limiting FSL state (1111111). The directionality of the first RF coupler 20-1 enables accurate sensing of the presence of an interfering signal independent of the FSL state. The example simulation shown in FIG. 5B is for the detector circuitries 14-1 and 14-2 fabricated using gallium arsenide (GaAs) fabrication processes. Output voltage $V_{ANT}$ transitions from approximately 0 V to 2 V when a signal at the ANT port 16 exceeds −18.3 dBm±0.5 dB for FSL limiting and non-limiting (0000000) states.

Figure 6A:
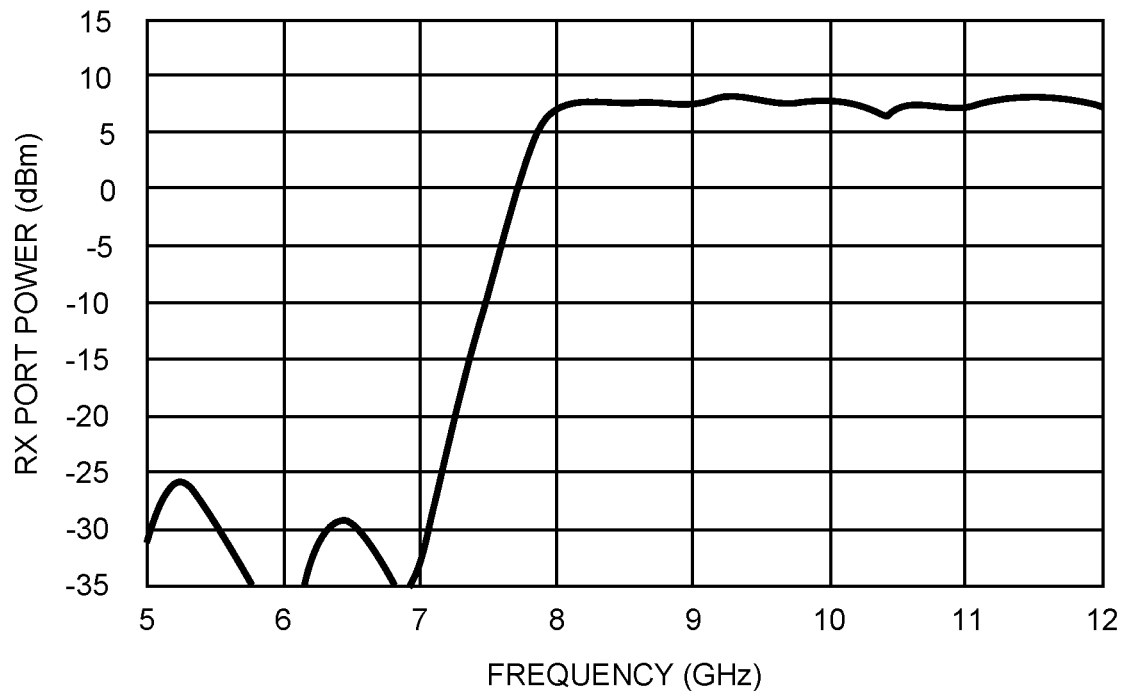
FIG. 6A is a graph of receiver port power versus frequency for the FSL of FIG. 4A with the seven-channel intrinsically switch multiplexer FSL set to state 0001111 and a 10 dBm antenna port signal.
Figure 6B:
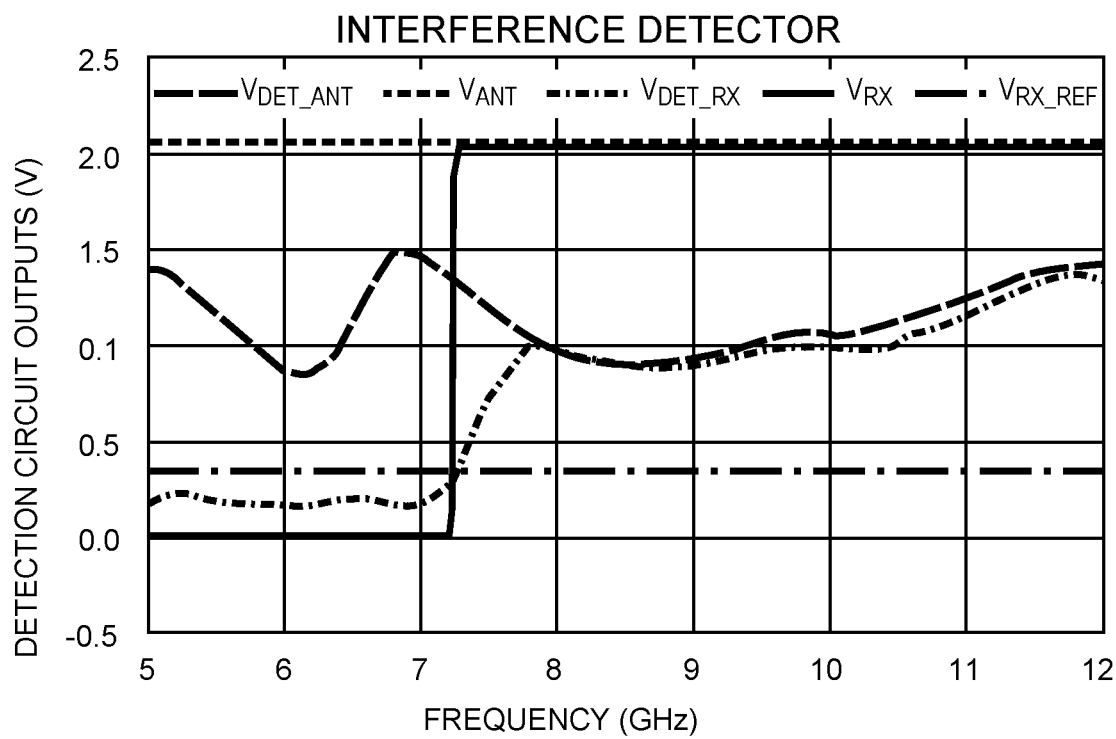
FIG. 6B is a graph of signals associated with interferer detection for the FSL of FIG. 4A with the antenna port input having a 10 dBm interferer.

The second detector circuitry 14-2 at the RX port 18 is used to determine which filters of the switched multiplexer filter bank 12 to disable. Consider the scenario shown in FIG. 5A in which a frequency swept 10 dBm signal is incident to the ANT port 16 and FSL state 1001111 is activated. A detection threshold for the RX port 18 is set such that $V_{RX}$ transitions high when the RX port power level exceeds approximately −20 dBm. The long-dashed line at approximately 2 V in FIG. 5B is voltage $V_{ANT}$ and is high for all frequencies, indicating the presence of the foregoing threshold ANT port signal. The solid black trace is detected voltage $V_{RX}$, which is high when the RX port power is above roughly −20 dBm. The selected FSL setting is unable to reject the ANT port signal below −20 dBm in the middle portion of the rejection band. This is correctly indicated by the second detector circuitry 14-2 of the RX port 18 as it transitions high between 6.7 GHz to 7.1 GHz. The second detector circuitry 14-2 correctly indicates below −20 dBm rejection between 6.2 GHz to 6.7 GHz and 7.1 GHz to 7.3 GHz. To get −20 dBm rejection at 7 GHz, a third channel needs to be deactivated. This is shown in FIGS. 6A and 6B for FSL state 0001111. The digital controller 28 attempts two-channel de-activations first, leaving the maximum amount of passband available. If two-channel de-activations do not achieve the desired level of rejection, then the digital controller 28 resorts to three-channel de-activations and so forth.

Various methods may be used to find the proper FSL settings for signal rejection. All adjacent two-channel and three-channel settings are listed in a table in FIG. 7A. A total of 12 such settings and a modern microcontroller rapidly converge to the correct setting. The two-channel settings are attempted first, followed by the three-channel settings if required.

Figure 7B:
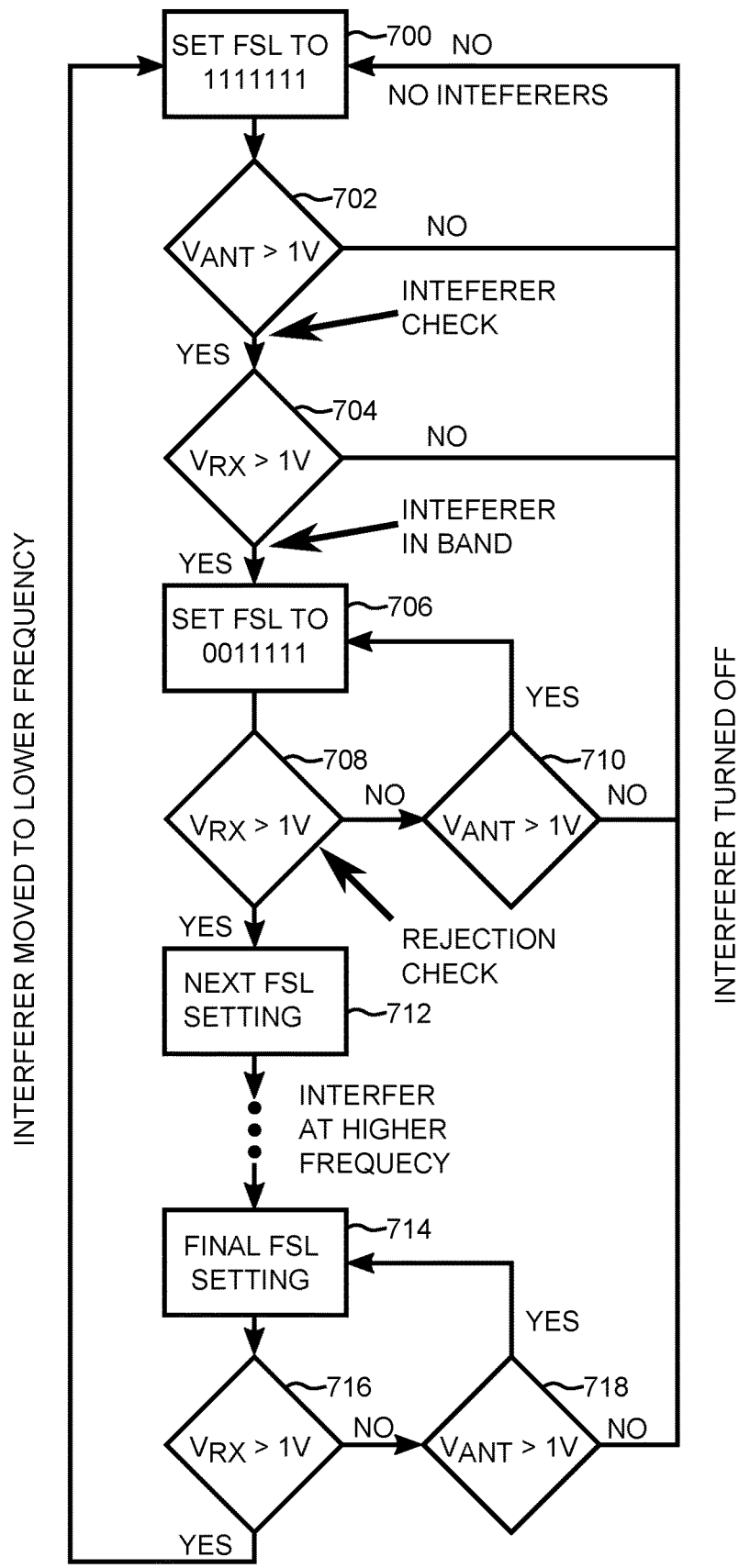
FIG. 7B shows a single interferer controller process executed by a digital controller of the FSL of FIG. 4A.

An exemplary method suitable for rejecting a single interfering signal is shown in FIG. 7B. The digital controller 28 initializes the FSL setting to the maximum passband state 1111111 (step 700). The FSL setting remains in the maximum passband state until the first detection circuitry 14-1 at the ANT port 16 indicates to the digital controller 28 the presence of an interfering signal, that is, $V_{ANT}$>1 V (step 702). Since the first detector circuitry 14-1 and the second detector circuitry 14-2 are typically wideband, a signal outside of the passband of 1111111 state can trigger the ANT port decision to logic high. Therefore, the receiver voltage $V_{RX}$ output by the second detection circuitry 14-2 at the RX port 18 is checked next (704). If $V_{RX}$<1 V, then the out-of-band frequency response of the FSL 10 is sufficient to reject the interferer and the FSL 10 remains in the 1111111 state. If $V_{RX}$>1 V, then the signal is in-band, and the digital controller 28 transitions the FSL state to the second state, 0011111 (step 706). The digital controller 28 then checks $V_{RX}$ (step 708). The controller continues through the FSL states until $V_{RF}$ transitions low. Assuming $V_{RX}$<1 V is detected for state 0011111, one of two events have occurred: either the selected FSL state rejected the signal, or the signal was turned off. To check if the signal is still present, $V_{ANT}$ is checked next (step 710). If the signal is no longer present, then the digital controller 28 returns the FSL 10 to the 1111111 state. If the interferer is still present, then the FSL remains in the 001111 state until $V_{RX}$>1 V (signal changed frequency) or $V_{ANT}$<1 V (signal was turned off) is detected. For this case, the digital controller 28 sets the FSL to the next state, 1001111 (step 712) and the process is repeated.

Eventually, a final FSL setting is reached (step 714). At this point, the receiver voltage $V_{RX}$ output by the second detection circuitry 14-2 at the RX port 18 is checked (step 716). Assuming $V_{RX}$<1 V is detected for final FSL state, one of two events have occurred: either the selected FSL state rejected the signal, or the signal was turned off. To check if the signal is still present, $V_{ANT}$ is checked next by the digital controller 28 (step 718). If the signal is no longer present, then the digital controller 28 returns the FSL 10 to the 1111111 state. If the interferer is still present, then the FSL 10 remains in the final state until $V_{RX}$>1 V (signal changed frequency) or $V_{ANT}$<1 V (signal was turned off) is detected. For this case, the digital controller 28 returns the FSL 10 to the initial state, 1111111 (step 700) and the process is repeated.

The FSL 10 rejects multiple interferers at different frequencies, and more complex methods are available for selecting the FSL settings, for example, using the FSL in a spectrum analyzer mode scanning across the passband with a single channel activated while monitoring $V_{RX}$. This identifies the frequency bands that contain interfering signals. The lookup table 36 in memory 34 can then be read to set an FSL state to reject multiple interferers.

It is contemplated that any of the foregoing aspects, and/or various separate aspects and features as described herein, may be combined for additional advantage. Any of the various embodiments as disclosed herein may be combined with one or more other disclosed embodiments unless indicated to the contrary herein.

Those skilled in the art will recognize improvements and modifications to the preferred embodiments of the present disclosure. All such improvements and modifications are considered within the scope of the concepts disclosed herein and the claims that follow.

What is claimed is:

1. A frequency selective limiter (FSL) comprising:
   a switched multiplexer filter bank having a plurality of filters coupled between an antenna port and a receiver port, wherein the switched multiplexer filter bank is configured to enable and disable selected ones of the plurality of filters in response to control signals received over a control interface;
   first detector circuitry coupled to the antenna port and configured to detect signal voltage at the antenna port and generate a first detector voltage;
   second detector circuitry coupled to the receiver port and configured to detect signal voltage at the receiver port and generate a second detector voltage; and
   a digital controller coupled between the first detector circuitry, the second detector circuitry, and the control interface, wherein the digital controller is configured to limit interfering signals by sending the control signals to the switched multiplexer filter bank in response to the first detector voltage and the second detector voltage.

2. The frequency selective limiter of claim 1 wherein the first detector circuitry comprises:
   a first radio frequency (RF) coupler that is coupled to the antenna port and configured to sample a first signal voltage at the antenna port;
   a first logarithmic detector coupled to the first RF coupler and configured to generate a first scaled voltage in response to the first sampled signal voltage; and
   a first operational amplifier having a first signal input coupled to the first logarithmic detector, a threshold input, and a first output terminal coupled to a first input terminal of the digital controller, wherein the first operational amplifier is configured to generate the first detector voltage in response to the first scaled voltage and a threshold voltage at the threshold input.

3. The frequency selective limiter of claim 2 wherein the second detector circuitry comprises:
   a second radio frequency (RF) coupler that is coupled to the receiver port and configured to sample a second signal voltage at the receiver port;
   a second logarithmic detector coupled to the second RF coupler and configured to generate a second scaled voltage in response to the second sampled signal voltage; and
   a second operational amplifier having a second signal input coupled to the second logarithmic detector, a reference input, and a second output terminal coupled to a second input terminal of the digital controller, wherein the second operational amplifier is configured to generate the second detector voltage in response to the second scaled voltage and a reference voltage at the reference input.

4. The frequency selective limiter of claim 2 wherein the first logarithmic detector is logarithmic.

5. The frequency selective limiter of claim 2 wherein the first RF coupler is directional.

6. The frequency selective limiter of claim 1 wherein the first detector circuitry and the second detector circuitry are fabricated from gallium arsenide technology.

7. The frequency selective limiter of claim 1 further comprising a memory interfaced with the digital controller.

8. The frequency selective limiter of claim 7 wherein the memory is configured to store values of FSL states that are used by the digital controller to enable and disable selected ones of the plurality of filters of the switched multiplexer filter bank.

9. The frequency selective limiter of claim 8 wherein the values of FSL states are stored in a lookup table.

10. The frequency selective limiter of claim 8 wherein the digital controller is further configured to read a value of an FSL state for rejecting multiple interferers from the lookup table and set the FSL state of the switched multiplexer filter bank to reject the multiple interferers.

11. The frequency selective limiter of claim 8 wherein an FSL state value corresponding to an all-stop state provides greater than 35 dB of rejection over a frequency band between 2 GHz and 18 GHz.

12. The frequency selective limiter of claim 8 wherein the digital controller is further configured to initialize an FSL state corresponding to a maximum passband state.

13. The frequency selective limiter of claim 12 wherein the digital controller is further configured to leave the switched multiplexer filter bank in the maximum passband state until the first detector circuitry indicates that an interferer is at the antenna port.

14. The frequency selective limiter of claim 13 wherein the digital controller is further configured to change the FSL state corresponding to reject the interferer indicated at the antenna port.

15. The frequency selective limiter of claim 12 wherein the digital controller is further configured to leave the switched multiplexer filter bank in the maximum passband state until the second detector circuitry indicates that an interferer is at the receiver port.

16. The frequency selective limiter of claim 15 wherein the digital controller is further configured to change the FSL state corresponding to reject the interferer indicated at the receiver port.

17. The frequency selective limiter of claim 9 wherein the digital controller is further configured to change the FSL states in a spectrum analyzer mode scanning across a passband with a single channel activated while monitoring the second detector voltage associated with the receiver port to detect multiple interferers.

18. The frequency selective limiter of claim 17 wherein the digital controller is further configured to read a value of an FSL state and set the FSL state of the switched multiplexer filter bank to reject the detected multiple interferers.

* * * * *